(12) United States Patent
Iftikhar

(10) Patent No.: US 11,403,959 B1
(45) Date of Patent: *Aug. 2, 2022

(54) MULTI-MEDIA METHOD FOR ENHANCED RECALL AND RETENTION OF EDUCATIONAL OF EDUCATIONAL MATERIAL

(71) Applicant: Naveed Iftikhar, Chapel Hill, NC (US)

(72) Inventor: Naveed Iftikhar, Chapel Hill, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/083,258

(22) Filed: Oct. 28, 2020

Related U.S. Application Data

(63) Continuation-in-part of application No. 15/454,443, filed on Mar. 9, 2017, now Pat. No. 10,854,101.

(60) Provisional application No. 62/305,747, filed on Mar. 9, 2016.

(51) Int. Cl.
*G09B 7/04* (2006.01)

(52) U.S. Cl.
CPC ..................... *G09B 7/04* (2013.01)

(58) Field of Classification Search
CPC .................................. G09B 5/00; G09B 7/04
See application file for complete search history.

(56) References Cited

U.S. PATENT DOCUMENTS

| | | | | |
|---|---|---|---|---|
| 6,024,577 A * | 2/2000 | Wadahama | ............... | G09B 5/14 434/322 |
| 6,045,363 A * | 4/2000 | Phillips | ..................... | G09B 1/00 434/170 |
| 6,077,085 A * | 6/2000 | Parry | ..................... | G09B 19/06 434/322 |
| 10,854,101 B1 * | 12/2020 | Iftikhar | ..................... | G09B 7/04 |

* cited by examiner

*Primary Examiner* — Robert J Utama
(74) *Attorney, Agent, or Firm* — Bruce E. Weir

(57) ABSTRACT

A method for enhancing recall and retention of educational material includes sending a series of structured interactions that are derived from educational material to a learner in small, discrete chunks over a period of time. The interactions may be repetitive and may require learner input and interaction.

2 Claims, 7 Drawing Sheets

Content

An atom is the smallest constituent unit of ordinary matter that has the properties of a chemical element.[1] Every solid, liquid, gas, and plasma is composed of neutral or ionized atoms. Atoms are very small; typical sizes are around 100 pm (a ten-billionth of a meter, in the short scale).[2] However, atoms do not have well defined boundaries, and there are different ways to define their size which give different but close values.

Atoms are small enough that classical physics gives noticeably incorrect results. Through the development of physics, atomic models have incorporated quantum principles to better explain and predict the behavior. Every atom is composed of a nucleus and one or more electrons bound to the nucleus. The nucleus is made of one or more protons and typically a similar number of neutrons (none in hydrogen-1). Protons and neutrons are called nucleons. Over 99.94% of the atom's mass is in the nucleus. The protons have a positive electric charge, the electrons have a negative electric charge, and the neutrons have no electric charge.

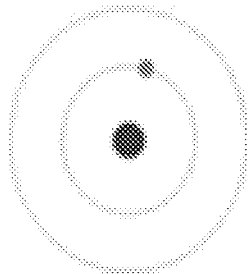

Learning Snippets

An atom is the smallest constituent unit of ordinary matter.   204

Every atom is composed of a nucleus and one or more electrons
206

The nucleus is made of one or more protons and neutrons   208

The protons have a positive electric charge.   210

212   Electron Spinning around a Nucleus

Learning Snippets

An atom is the smallest constituent unit of ordinary matter.      204

Every atom is composed of a nucleus and one or more electrons.
206

The nucleus is made of one or more protons and neutrons.    208

The protons have a positive electric charge.    210 electrons have a negative electric charge.    214

FIG. 6

Interactions

Click this link to answer a few
questions about the Atom.   402

The nucleus is made of one or
more protons and neutrons   404

The nucleus is made of one or more
_____ and _____
FILL IN THE BLANKS   406
Reply to this text with your response
click to submit your answer.

What is a nucleus?   408

Reply to this text with your response or
click to submit your answer.

Click this see an Atom.   410

FIG. 7

| Engagement Schedule | Day 1 | Day 2 | Day 3 | Day 4 | Day 10 | Day 13 | Day 30 |
|---|---|---|---|---|---|---|---|
| Learning Snippet 1 | Interaction_3 Interaction_1 | Interaction_1 Interaction_2 | Interaction_4 Interaction_1 | Interaction_1 Interaction_2 Interaction_3 | Interaction_3 | Interaction_3 Interaction_4 Interaction_5 | Interaction_3 Interaction_1 |
| Learning Snippet 2 | Interaction_3 Interaction_2 Interaction_5 | Interaction_1 Interaction_2 | Interaction_1 Interaction_2 Interaction_3 | Interaction_1 Interaction_2 Interaction_3 | Interaction_3 Interaction_1 | Interaction_1 | Interaction_3 Interaction_2 Interaction_5 |

FIG. 8

MULTI-MEDIA METHOD FOR ENHANCED RECALL AND RETENTION OF EDUCATIONAL OF EDUCATIONAL MATERIAL

CROSS-REFERENCES TO RELATED APPLICATIONS

This application claims the benefit of U.S. patent application Ser. No. 15/454,433, filed by the same inventor on Mar. 9, 2017, now pending, which claimed the benefit of U.S. provisional patent application Ser. No. 62/305,747, filed by the same inventor on Mar. 9, 2016.

BACKGROUND

Improving educational and training outcomes has been an ongoing challenge for broad segments of society. One of the critical factors affecting educational and training outcomes is the ability of the learner to retain and recall significant aspects of the content over time after a learning engagement such as a lecture, discussion or reading is completed.

Psychologists, educators, neuroscientists and other researchers who study learning have uncovered a multiplicity of factors that can significantly impact and improve retention and recall of any educational and training content. These insights have had a rather limited impact on how education and training are conducted, because implementing them has not been easy. The essential factors enhancing content retention and recall of information are priming, cognitive anchor-points, multi-sensory engagement, information chunking, forced recall, diverse engagement venues and time-spaced engagement.

Priming is an implicit memory effect in which exposure to one stimulus influences the response to another stimulus. For example, if a teacher gives a class a simulated final exam at the beginning of a course, before students have been exposed to the course content, students perform significantly better on the actual final at the end of the course than they would if they had not been given the simulated final exam. Scores on the actual final exam improve regardless of how the students performed on the simulated exam.

Cognitive Anchor Points are keywords or portions of educational content that because of their proximity or relevance to larger sections of course content trigger a learner's memory of that course content.

Multi-Sensory Engagement involves two or more of the senses within the same activity.

Information Chunking presents no more than seven pieces of information related to a specific learning objective within a short span of time.

Forced Recall requires a learner to actively recall information rather that passively reviewing that information. For example, the learner would be prompted to recall and write down information learned from a source text instead of re-reading the source text.

Diverse Engagement Venues requires a learner to engage with study material in different physical surroundings each time the material is studied and reviewed.

Time-spaced Engagement requires a learner to study or review portions of study material in many short time blocks spread over several days rather than attempting to absorb an entire topic in a single block of time.

SUMMARY

A preferred embodiment of the invention provides a method for enhancing retention and recall of educational content. Content is extracted from educational text, audio or video. Extracted content may be categorized and supplemented with additional material drawn from libraries and the web. Extracted content is rendered into learning snippets, which are brief questions or statements designed to first teach content, then test and reinforce retention of learned material. Learning snippets are delivered via push notification to smartphone, computer and other means on a schedule that employs priming, cognitive anchor points, multi-sensory engagement, information chunking, forced recall, diverse engagement venues and time-spaced engagement to reinforce learning, retention and recall.

BRIEF DESCRIPTION OF THE DRAWINGS

FIG. 3 shows an example of a source of informational content.

FIG. 6 shows alternate Learning Snippets extracted from the content of FIG. 3.

FIG. 7 shows multi-sensory interactions derived from the Learning Snippets of FIG. 6.

FIG. 8 shows a sample schedule of interactions delivered during a time-spaced engagement.

DETAILED DESCRIPTION

In the Summary of the Invention above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number) (a second number)," this means a range whose lower limit is the first number and whose upper limit is the second number. For example, 25 to 100 mm means a range whose lower limit is 25 mm, and whose upper limit is 100 mm.

Figure 1:
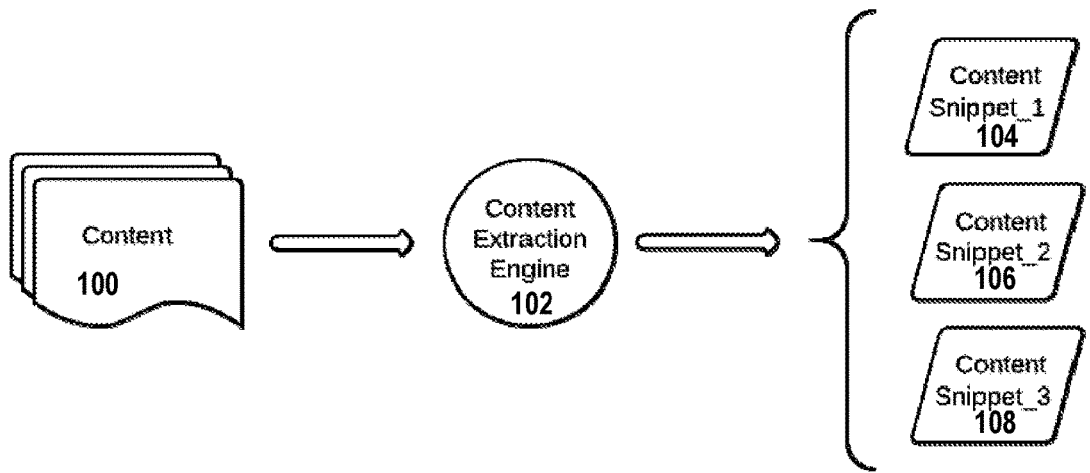
FIG. 1 is a schematic diagram showing the extraction of Content Snippets from a source of informational content.

An embodiment of the invention extracts discrete elements of declarative knowledge such as definitions, facts and vocabularies from educational material. FIG. 1 shows a schematic diagram of the content element extraction process. Extraction of content 100 may be performed by a human reader or by a content extraction engine 102. Each extracted content element becomes a content snippet 104, 106, 108.

The content extraction engine 102 is a computer-based text processing and analysis system which uses Natural Language Processing (NLP) technologies to create content snippets. The NLP system of an embodiment of the invention comprises one or more dictionaries, a learning grammar and task-specific libraries. Additional items can be added to achieve specific results from the NLP system. As an example, an NLP system can be used to determine the sentiment of a document by using a library that categorizes and classifies words according to their sentiment (i.e. 'hate' is a negative sentiment).

Subject dictionaries are utilized for identifying subject and subsequent topics and sub-topics. For example, dictionaries for physics contain terms such as atom, standard model, quantum theory, and energy. Dictionaries for economics contain terms such as inflation, money supply, M1, and M2. Each definition in a subject dictionary is further segmented into sub-topics and ranked from basic concepts to advanced concepts. For example, atom is a basic concept but a Feynman diagram is an advanced concept. The content extraction engine identifies content snippet topics by matching terms in a content snippet to terms in a subject dictionary.

A learning grammar is based on a set of trigger words and/or expressions defined according to one or more selected knowledge models. The learning grammar comprises words or expressions that are most often used to describe learning elements within a text. Exemplary words and expressions are "An atom (topic keyword) is the smallest (adjective) unit of matter (topic keyword)," "means," and "defined as." In these examples the inventive system identifies a character string as a sentence if it includes a topic keyword and an adjective or number, or other listed words such as "means" or "defined as."

Content snippets including trigger words may be classified into categories such as definition, fact, and example. Additionally, any non-textual content such as images, web URLs or bar codes are identified with reference to their place in the text and their possible caption/heading/label and made part of a content snippet.

A further embodiment of the invention may include a content augmentation system that processes topic, sub-topic and word summary output from the content extraction engine, then uses a search engine to find and retrieve similar or supplementary results from internal libraries or from open resources on the internet. Results collected by crawling the web are parsed by the content extraction engine. Only results containing the proper subset of topic keywords are displayed. Content can be further refined by date and authority of publication. The content augmentation system may determine the educational appropriateness of a resource by LEX-ILE® educational level measurement scores or other such measures to ascertain the educational level of the learner.

An exemplary taxonomy of scientific topics and sub-topics ordered from broadest to narrowest is natural sciences, physics, atomic physics, structure of atom (advanced), structure of atom (intermediate), and structure of atom (basic). Topic keywords for each sub-topic may be extracted from a subject dictionary. As an example, the occurrence of keywords atom, nucleus, electron, neutron and proton combined with the absence of keywords quark, gluon and standard model would cause the system to classify the content as structure of atom (basic).

Published content may be extracted from commercially-available sources such as books, magazine articles, webinars and podcasts. As an example, a learner who wishes to improve recall of an article in an industry publication such as the Harvard Business Review may have the article processed through the system and made available to the learner.

Content may also be extracted from audio and video content, which are first transcribed into text using speech to text technologies. Text segments are demarcated by word and line position. Transcribed video and audio text is demarcated by time stamps on the audio and video timeline.

Figure 2:
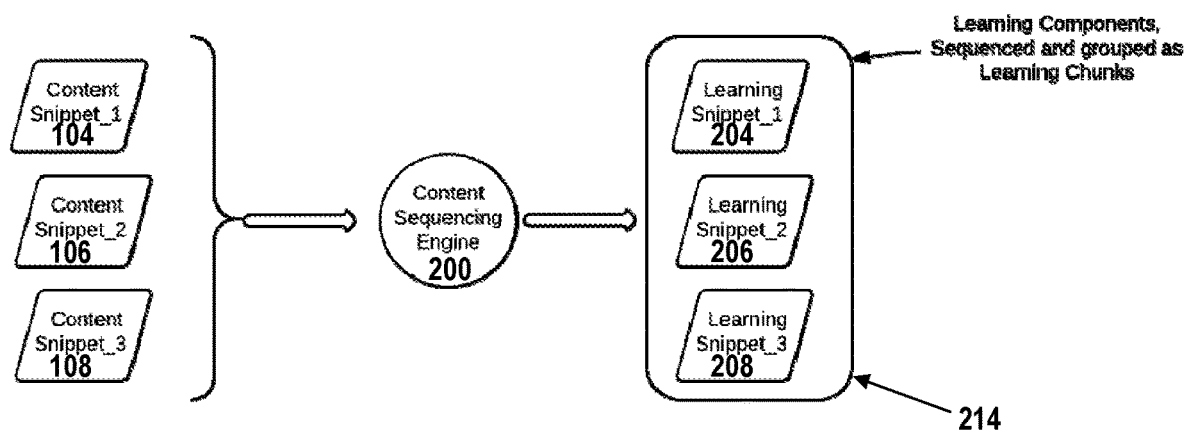
FIG. 2 is a schematic diagram showing the sequencing of Content Snippets into Learning Snippets and grouping of Learning Snippets into Learning Chunks.

As shown in FIG. 2, small sets of content snippets 104, 106, 108 are ordered by a content sequencing engine 200 into learning snippets 204, 206, 208, then grouped as learning chunks 214. Learning snippets are the basic building blocks of the training programs created and delivered by the invention. The content sequencing engine 200 is a computer equipped with a natural language application. The content sequencing engine 200 arranges content snippets in order of occurrence in a content source, then groups them into learning chunks. Typical learning chunks comprise five plus or minus two learning snippets.

Figure 4:
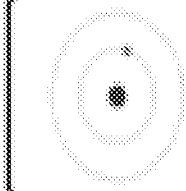
FIG. 4 shows Learning Snippets extracted from the content of FIG. 3.

Since a typical young person's working memory can reliably retain no more than seven digits, six letters, or five words, learning chunks by default contain no more than seven learning snippets per content subject. Working memory generally diminishes as a user ages, with typical older adults retaining four or fewer learning snippets. The default limit may be changed manually by the user or by modifications to content sequencing engine settings, allowing the user to limit the number of learning snippets in a learning chunk to a number that is efficient for the user. FIG. 4 provides an example of learning snippets 204, 206, 208, 210, 212 extracted from content 100 as shown in FIG. 3. In an alternate embodiment a learner may create and select learning snippets for storage in a library and subsequent grouping as learning chunks.

Figure 5:
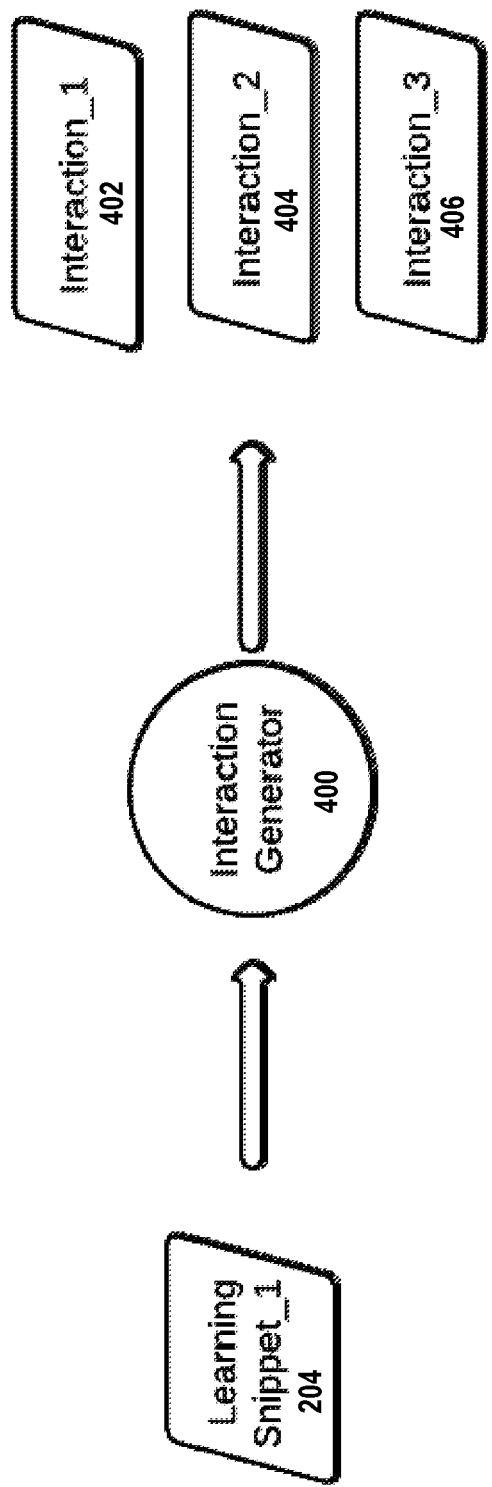
FIG. 5 is a schematic diagram showing a Learning Snippet converted into a series of multi-sensory interactions.

FIG. 5 shows a learning snippet 204 within a learning chunk processed by an interaction generator 400 to produce a series of interactions 402, 404, 406 to be delivered to a learner. FIGS. 6 and 7 provide examples of interactions 402, 404, 406, 408, 410 generated from corresponding learning snippets 204, 206, 208, 210, 214. Interactions enhance content retention and recall of information by utilizing multi-sensory engagement, priming and forced recall.

The interaction generator is a text manipulation system. Each word in a learning snippet is classified according to its position in the source text, then classified as a topic keyword, a "stop word" such as is, a, an; or a part of speech such as a verb, noun, adjective, determiner, adverb, pronoun, preposition, conjunction or interjection.

The interaction generator produces interactions in several formats, including presentation, open-ended, rearrangement and fill-in. The presentation format 404 presents the unmodified text of a learning snippet along with links to any reference material. The open-ended format 408 relies on known NLP processing techniques to present simple open-ended questionnaires containing interrogatives related to a topic keyword, such as "What is an Atom (topic keyword)?" or "Define an Atom (topic keyword)?" The rearrangement format presents the user with a random jumble of words derived from a learning snippet. The fill-in format 406 presents a sentence from which the system has removed certain types of words such as the topic keyword, two or more letter words that do not include the topic keyword, an adjective and a topic keyword. An example is "Atom (topic keyword) is the smallest part of an element."

Three primary interactions types are priming, review and forced recall. Priming and forced recall interactions require a response from the learner. Priming requires a learner to answer a set of questions based on a collection of learning snippets before exposure to the learning snippets. Forced Recall requires a varied response from the learner. Responses incorporate multi-sensory response and may include typing a word or a sentence, using a mouse or a hand to write a response, and using the microphone to record a response. Review interactions present the learner with the content of a learning snippet in text, audio or video form.

The inventive system develops an engagement schedule by selecting the formats and types of interactions to be delivered to a learner, then defining the order, frequency and modes of delivery. An engagement schedule is algorithmically developed taking into account learner objectives such as strength of recall and time period for recall (month, year, multi-year).

FIG. 8 provides a sample engagement schedule 600 for delivery of interactions. Interactions for each learning snippet are delivered in a structured sequence. A priming interaction is delivered as the first interaction. A review interaction is delivered as a second. Subsequent interactions, comprising of priming, review and forced recall are spread out over an extended period of time.

Interactions may be delivered to the learner via a multitude of modes, including but not limited to text message, email, and messaging applications such as FACEBOOK® Messenger messaging application, WHATSAPP® messaging application, GOOGLE+® messaging application, SLACK® messaging application, and HIPCHAT® messaging application, and may be delivered through internet-connected programmable digital computing devices including but not limited to desktop computers, notebook computers, tablets, web-enabled television screens, smartphones and mobile devices including but not limited to wearables such as the GOOGLE® Glass mobile device and the APPLE® iWatch mobile device.

A learner initiates a training program by selecting a source of educational material for content extraction. In an alternate embodiment of the invention a learner may subscribe to a publication that has already processed its content with the invention and provides interactions on demand. Once the desired content has been extracted and prepared for delivery the learner is primed by completing a comprehensive simulated final examination on the educational material. The learner is then asked to review examination results and score his or her responses. Self-scoring and self-evaluation improve information retention and the learner's awareness and understanding of his or her own thought processes.

When a learner has completed the priming stage the system begins delivery of interactions 402, 404, 406, 408, 410 according to an engagement schedule 600. Each engagement session starts with an invitation 402 to answer questions about an identified study topic. If the learner responds to the invitation, interactions containing the content of two or more learning chunks comprising seven to fourteen learning snippets are sent sequentially. An interaction may include a hyperlink to any reference material the learner wish to review.

A schedule of interactions may be distributed over a time period ranging from hours to months, depending on the objectives of the learner. Interactions are presented to the learner at random times to ensure forced recall of content and to require recall in a variety of environments.

In another embodiment of the invention a learner may be asked to describe his or her environment, such as but not limited to the dinner table, a gym, or a park, immediately after responding to an interaction. In an alternate embodiment the learner may be asked to undertake interactions within a set time. A learner may be sent reminders if the learner does not respond in a timely fashion. A learner may set Do Not Disturb time slots, during which no interactions are sent.

Interactions require a variety of responses. Responses may include completing blanks in a text segment with missing words, writing a summary of the content from memory, verbally describing the key elements of a learning chunk, responding verbally with a microphone on a multimedia device, rearranging words in a jumbled sentence, and writing a response to an interaction on a piece of paper and transmitting an image of the written response via email or text message. In a further embodiment of the invention, the learner may at random intervals be presented with one or more questionnaire(s) to assess the learner's retention of content. Questionnaire responses may be evaluated to identify areas of deficiency. Delivery of subsequent interactions may then be altered to focus on those areas of deficiency. The system continually evolves through the use of machine learning and more pertinent data.

By combining content libraries in the system with subject dictionaries and topic classifiers a learner may identify his or her learning objectives, with the system then guiding the learner through the identified subject matter. For example, if the goal is to learn about the standard model in physics, the system would guide the learner through all the content describing the standard model. A learner can be offered the option of completing self-assessments to measure any gap between the learner's current state of knowledge and the learner's goals. The learner may then use the system to develop a learning program to close the knowledge gap.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

I claim:

1. A method for enhancing retention and recall of educational content comprising:

selecting a source of educational material;
extracting content snippets from the source educational material;
sequencing the content snippets into learning snippets with a programmable digital computing device;
grouping learning snippets into at least a first learning chunk with the programmable digital computing device, the first learning chunk comprising between three and seven learning snippets, the maximum number of learning snippets in the first learning chunk adjusted to a user's working memory capacity;
producing with the programmable digital computing device at least a first interaction containing learning snippets from within the first learning chunk;
selecting a format and a type for the first interaction;
developing an engagement schedule by defining an order of delivery, a frequency of delivery and a mode of delivery; and
delivering the first interaction to a learner via the Internet, and
prompting the learner to recall and write down information learned from the source.

2. A method for enhancing retention and recall of educational content comprising:
selecting a source of educational material;
extracting content snippets from the source educational material;
sequencing the content snippets into learning snippets with a programmable digital computing device;
grouping learning snippets into at least a first learning chunk with the programmable digital computing device, the first learning chunk containing at least three but not more than seven learning snippets, the maximum number of learning snippets in the first learning chunk adjusted to a user's working memory capacity;
producing with the programmable digital computing device at least a first interaction containing learning snippets from within the first learning chunk, the first interaction having a format selected from the group consisting of presentation, open-ended, rearrangement and fill-in;
selecting a format and a type for the first interaction;
selecting priming as the first interaction type;
developing an engagement schedule by defining an order of delivery, a frequency of delivery and a mode of delivery;
delivering the first interaction to a learner via the Internet, the first interaction prompting a learner response, the learner response including typing at least a first word, writing at least a second word, and recording at least a third word with a microphone; and
prompting the learner to respond to the first interaction and to describe the learner's physical environment immediately after responding to the first interaction.

* * * * *